United States Patent Office 3,147,196
Patented Sept. 1, 1964

3,147,196
PROCESS FOR THE PRODUCTION OF PURIFIED, SALT-FREE ENZYME PREPARATIONS
Fritz Ziegler and Werner Frommer, Wuppertal-Elberfeld, Germany, assignors to Farbenfabriken Bayer Aktiengesellschaft, Leverkusen, Germany, a corporation of Germany
No Drawing. Filed May 23, 1962, Ser. No. 196,907
2 Claims. (Cl. 195—66)

This invention relates, in general, to a new and improved process for the production and recovery of purified, salt-free enzyme preparations. More particularly, the invention involves the provision of a unique process for the separation of enzyme-containing fractions by tannin precipitation from enzyme solutions and the treatment of such fractions to recover tannin-free enzymes.

It has been shown heretofore that proteins can be precipitated out of their solutions with tannin in the form of water-insoluble compounds and, in point of fact, the use of tannin as a group reagent for proteins depends on this mechanism. In the case of such a precipitation, however, compounds whose tannates are also insoluble are co-precipitated with the proteins. The complete separation of tannin from such mixed precipitates is generally very difficult, because the precipitates often can be only incompletely broken down into their components. In addition, while it is possible to eliminate the greater proportion of the tannin from pure protein precipitates by repeated washings with acetone or alcohols, under these conditions separation of the proteins is not possible.

For the foregoing reasons, among others, tannin precipitation for the purification and concentration of proteins is only rarely employed, and even in its application for the production of enzyme preparations it is seldom utilized because of its non-specificity.

The present invention is based, in part, on our discovery that purified, salt-free enzyme preparations can be produced by precipitating enzyme solutions in conventional manner with tannin, extracting from the precipitate obtained, which still contains ballast materials and possible after washing with water, an enzyme-containing fraction by use of aqueous solutions of water-miscible organic solvents, and precipitating from the extracts by the addition of water-miscible ketones or alcohols the desired tannin-free enzyme.

The foregoing processing technique is based on our observation that the tannates of many enzymes, in contrast to the tanning compounds of most of the other protein materials and the frequently co-precipitated ballast materials, are surprisingly soluble in aqueous solutions of water miscible organic solvents so that they can be separated quite readily from the other tannin compounds. The production and recovery of the desired tannin-free enzymes from the extracts thus produced are effected in a simple manner by the addition thereto of the water-miscible alcohols or ketones, in that, the enzymes precipitate-out readily, whereas the tannin remains in solution. Accordingly, when the tannin precipitates are previously washed with water, the enzymes can be obtained free from soluble salts.

As will be readily appreciated from the foregoing explanation, the process of the invention can also be employed to free already pre-purified but still water-soluble compounds, especially salt-containing enzyme preparations, from the ballast materials, and without prior use of conventional laborious measures. In this type of operation, the tannin precipitate, after the water wash, can be extracted with, for example, about fifty percent (50%) acetone, and the extract then further treated with 3 to 6 times the amount of acetone to effect precipitation of the enzyme.

In addition to acetone, other water-miscible organic solvents, such as alcohols, like methanol, ethanol, propanols and tert. butanol, glycols, like ethylene glycol, propylene glycols and butylene glycols, glycol ethers, ketones like acetone or methyl ethyl ketone, dioxan, tetrahydrofuran, lactic acid ethyl ester, hydroxy dialkyl ethers, like ethylene glycol monomethyl ether, ethylene glycol monoethyl ether or diethylene glycol monomethyl ether, and formamide, are suitable for the extraction, whereas for the final precipitation of the enzymes from the extracts water-miscible acetone and alcohols, like methanol, ethanol or propanols, are the preferred solvents. In the extraction operation, the water content of the mixture is adjusted to between 20–80 percent. If glycols are used, however, it is found to be expedient to use a smaller water content than is employed in conjunction with the use of alcohols, and especially ketones.

By virtue of the unique processing techniques of the invention, enzyme preparations are obtained in relatively pure form at yields which are considerably higher than those which are generally obtained by conventional methods including, for example, spray drying or ammonium sulfate precipitation. In addition, the process of the invention possesses the important advantage that it is effected under very mild conditions and does not, therefore, endanger the enzymes by possibly complete or partial decomposition of the same.

It is believed that the foregoing principles and procedures may be best understood by reference to the following specific examples illustrating the application of the process of the invention to the production of typical enzyme preparations:

*Example I*

410 liters of a filter culture broth of a mold fungus producing a cellulose-decomposing enzyme which contains, per cubic centimeter, about 3.2 LCU (lichenase comparative units according to W. Grassmann), i.e., in total about 1.30 million LCU, was concentrated in a vacuum at 30° C. to about 100 liters. The concentrate was mixed, with stirring, with 10 kilograms of ammonium sulphate and 600 grams of tannin dissolved in 6 liters of water. After adjustment of the pH value to about 5.8, the solution with the precipitate, was allowed to stand for about two (2) hours. The resulting precipitate, which in a moist state amounted to several kilograms, was then centrifuged, washed by slurrying in water and again centrifuged, and was then eluted first with 50 percent, and subsequently with 40 percent, aqueous acetone. The eluate, which was clarified by passing through a pressure filter and which amounted to about 15 liters, was mixed with about 65 liters of acetone. In order to accelerate the flocculation of the protein material, a small amount of an acetone solution of salicylic acid was added thereto which, at the same time, effected a brightening of the solution. After standing for a short time, the precipitate was centrifuged, again washed with acetone, and then dried. There remained behind 360 grams of a water-soluble preparation which contained about 1875 LCU per gram, i.e., in total about 0.675 million LCU. Since the tannin precipitation was still not complete, the mother liquor from the tannin precipitation was mixed with an additional 300 grams of tannin. The precipitate thus formed was worked up in the same way as the initial precipitate and yielded an additional 270 grams of a dry preparation with about 940 LCU per gram, i.e., in total about 0.252 million LCU. Thus, the total yield amounted to 0.928 million LCU which was about 71% of the amount of the enzyme present in the starting solution.

Example II

Within 540 liters of a culture filtrate obtained from the culturing of a protease-producing mold fungus, which contained per cubic centimeter about 110 TCU [TCU stands for tyrosine comparison units which is a small protease unit used for routine determinations which depends, in the same way as Anson's TU (tyrosine unit) on the liberation of tyrosine from casein by the action of proteases and is determined according to the same method but is considerably smaller and is adjusted to the prevailing size relationships in the spectrophotometric determination, i.e., in all about 59.4 million TCU], there were dissolved 50 kilograms of ammonium sulfate, and thereafter 750 grams of tannin dissolved in about 7 liters of water were stirred into the solution. After adjustment to a pH value of about 5.8 in the solution, it was left to stand for two (2) hours. After this period, the resultant precipitate was centrifuged, slurried once with several times its volume of water, and again centrifuged.

The considerably swollen precipitate was then successively eluted with 7 liters of 60 percent, 5 liters of 50 percent, and 3 liters of 40 percent aqueous acetone, the eluates combined (about 17 liters) and, after complete clarification by a pressure filter, poured into 5 times the amount of acetone. The resultant precipitate was again washed with acetone and then dried. The yield was 538 grams with about 94.5 TCU per milligram, corresponding to about 50.48 million TCU, or 84 percent of the amount of enzyme present in the culture filtrate.

Example III

A solution produced from pancreatin and clarified by filtration contained 168 TCU per cubic centimeter. After the addition of 20 cubic centimeters of a saturated ammonium sulfate solution, 490 cubic centimeters of this solution were precipitated with 50 cubic centimeters of a 10 percent tannin solution. After standing for one (1) hour, the precipitate was centrifuged, washed once with distilled water and then eluted with 50 percent acetone. The eluate, separated from the insoluble components and clarified by filtration (about 80 cubic centimeters) was precipitated with about six (6) times the volume of acetone, the precipitate washed with acetone and then dried. 1.4 grams of a preparation were obtained which demonstrated, per milligram, 42.8 TCU, i.e., in all about 73 percent of the proteolytic enzyme contained in the solution.

By admixture of the remaining acetone solution with an acetone solution of salicylic acid, a still further small amount (0.330 gram) of a preparation was precipitated which contained, per milligram, about 13.0 TCU.

The testing of the amylase activity of the main precipitate showed that it contained about 162 amylase units per gram, compared with 8 amylase units per gram in the starting precipitation of which, however, a part remained undissolved in the production of the solution.

Example IV 50 grams of a crude preparation of mushroom protease, which contained 11.8 TCU per milligram, i.e., in total about 590,000 TCU, was dissolved in 700 cubic centimeters of distilled water. The solution was mixed with 5 grams of tannin which was dissolved in 50 cubic centimeters of water, and was then adjusted to a pH value of 5.8. After standing for two (2) hours, the precipitate was centrifuged and washed once with several times the volume of water. The centrifuged, moist precipitate was then eluted with about 200 cubic centimeters of 50 percent cold ethanol, whereby the greater part went into solution. After clarification by filtration, the eluate (200 cubic centimeters) was divided into two (2) equal parts of which 100 cubic centimeters were precipitated with 600 cubic centimeters of acetone and 100 cubic centimeters with 600 cubic centimeters of cold ethanol. The flocculation was helped by the additions of small amounts of ammonium salicylate. The precipitates were washed with the precipitating agents and then dried. There were obtained with the acetone precipitation 3.25 grams of dry preparation with about 68.0 TCU/mg., corresponding to about a 75 percent yield, while with the ethanol precipitation there were obtained 2.90 grams of preparation with about 67.5 TCU/mg., corresponding to about a 66 percent yield.

Example V 250 cubic centimeters of a solution of a crude protease preparation, which contained per cubic centimeter about 94.5 TCU—in total about 236,000 TCU—were precipitated, with the addition of about 5 percent of ammonium sulfate, with 5 grams of tannin at pH 5.9. After two (2) hours, the precipitate was centrifuged and washed with distilled water. The moist precipitate was eluted with about 60 cubic centimeters of 50 percent isopropyl alcohol and the eluate clarified by filtration. The clear filtrate was precipitated with 360 cubic centimeters of cold isopropyl alcohol, the precipitate separated by centrifuging and, after washing with acetone, dried. There were obtained about 2.0 grams of a dry preparation with about 83.0 TCU/mg., corresponding to about a 70 percent yield.

Example VI 250 cubic centimeters of the protease solution used for Example V were precipitated in the same manner with tannin, the precipitate washed with water and then eluted with 40 cubic centimeters of about 60 percent ethylene glycol. After clarification, the eluate was precipitated with eight (8) times the volume of acetone, the precipitate washed with acetone and dried. The yield was about 2.2 grams of dry preparation with about 77 TCU/mg., corresponding to about 169,000 TCU or about 72 percent of the protease contained in the starting solution.

Example VII 25 grams of a crude protease preparation with 11.8 TCU/mg. were dissolved in 250 cubic centimeters of distilled water and, after the addition of some ammonium sulfate, precipitated with 5 grams of tannin at a pH of about 5.7. After washing of the precipitate with water, it was eluted with about 60 cubic centimeters of a 50 percent solution of ethylene glycol monoethyl ether (ethyl glycol), the eluate clarified and precipitated with about 450 cubic centimeters of acetone. The precipitate was washed with acetone and dried. The yield was 2.85 grams of dry preparation with about 71.5 TCU/mg., corresponding to about a 70 percent yield.

Example VIII 200 cubic centimeters of an enzyme solution obtained from the culturing of a protease-producing fungus, which contained 4.75 trypsin units (TE) according to Willstätter, were mixed with 40 cubic centimetres of 20 percent tannin solution of a pH of 5.7. The formed greatly swollen precipitate is washed with water and pasted with about ⅕ of its volume of methyl ethyl ketone at which the greater part liquefied. The remaining precipitate is mixed with a 25% aqueous solution of methyl ethyl ketone and the insoluble residue is separated. The combined clear extracts—about 50 cc.—are mixed with the threefold volume of acetone, the formed precipitate is filtered off, washed with acetone and dried in vacuo. Yield: 2.2 g. of a dry product, containing 3.30 TE per gram, i.e., about 76 percent of the amount of the enzyme present in the starting solution.

What is claimed is:

1. Process for the production of purified, salt-free enzyme preparation that comprises, treating an enzyme-containing solution by the addition of tannin thereto at a pH value within the range of from pH 5.0–6.0 to effect the production and recovery of the tannin-enzyme precipitate containing ballast materials present in the original solution, treating said precipitate by extraction with an aqueous solution of a water-miscible organic solvent selected from the group consisting of methanol, ethanol, propanol, tert. butanol, ethylene glycol, propylene glycol, butylene glycol, acetone, methyl ethyl ketone, dioxan, tetrahydrofuran, lactic acid ethyl ester, ethylene glycol monomethyl ether, ethylene glycol monoethyl ether, diethylene glycol monomethyl ether and formamide to recover an enzyme-containing fraction therefrom, and precipitating tannin-free enzyme from said fraction by the addition thereto of a water-miscible solvent selected from the class consisting of acetone and alcohols and at a pH value within the range of from pH 4.0–6.0.

2. The process as claimed in claim 1, that further comprises subjecting said tannin-enzyme precipitate to water washing to eliminate soluble salts from said enzymes.

References Cited in the file of this patent

UNITED STATES PATENTS

| | | |
|---|---|---|
| 2,452,000 | Wallenstein et al. | Oct. 19, 1948 |
| 3,047,471 | Hurst et al. | July 31, 1962 |
| 3,075,886 | Cayle | Jan. 29, 1963 |

OTHER REFERENCES

Methods in Enzymology, vol. I, pp. 234 to 240, p. 236 particularly relied on, 1955; QP601C72. (Copy in Div. 63 Science Library.)